(12) United States Patent
Moriya et al.

(10) Patent No.: US 6,276,482 B1
(45) Date of Patent: Aug. 21, 2001

(54) MOTORCYCLE UPPER-COWL

(75) Inventors: Yasunori Moriya, Shizuoka-ken; Koji Yoshiura, Hamamatsu, both of (JP)

(73) Assignee: Suzuki Motor Corporation, Shizuoka-Ken. (JP)

( * ) Notice: Subject to any disclaimer, the term of this patent is extended or adjusted under 35 U.S.C. 154(b) by 0 days.

(21) Appl. No.: 09/318,756

(22) Filed: May 25, 1999

(30) Foreign Application Priority Data

Jul. 13, 1998 (JP) .................................................. 10-197160

(51) Int. Cl.⁷ .................................................. B60K 11/00
(52) U.S. Cl. .......................... 180/229; 180/68.1; 296/78.1
(58) Field of Search ................... 180/68.1, 68.2, 180/68.3, 68.4, 68.6, 229; 296/78.1, 180.1, 208

(56) References Cited

U.S. PATENT DOCUMENTS

| | | | |
|---|---|---|---|
| 4,066,291 | * 1/1978 | Hickman | 296/78.1 |
| 4,320,906 | * 3/1982 | Saunders, IV | 296/78.1 |
| 4,703,825 | * 11/1987 | Mikami et al. | 180/229 |
| 4,709,774 | * 12/1987 | Saito et al. | 180/229 |
| 4,830,135 | * 5/1989 | Yamashita | 180/229 |
| 4,913,256 | * 4/1990 | Sakuma | 180/229 |
| 5,490,573 | * 2/1996 | Hagiwara et al. | 180/68.1 |
| 5,997,070 | * 12/1999 | Matsuo et al. | 296/78.1 |

FOREIGN PATENT DOCUMENTS

| | | |
|---|---|---|
| Hei 9 No. 86463 | 3/1997 | (JP) . |
| Hei 9 No. 242629 | 9/1997 | (JP) . |

* cited by examiner

*Primary Examiner*—Michael Mar
(74) *Attorney, Agent, or Firm*—Darby & Darby

(57) ABSTRACT

The overall surface of the upper-cowl body and the headlamp cover attached to the front part thereof are formed with a streamlined, basic cross-sectional shape such as an arc, parabola or some analogous section, which curves with its tangent being gradually directed toward the rear, from the forward part to the rear outer sides. A pair of air intakes opening forward for guiding air for engine supercharging, cooling heat exchanger, etc., are provided on the outer sides of the headlamp cover while a pair of turn signal lenses are arranged on the outer sides of the openings of the air intakes, so that the lens surfaces are projected forward from the basic cross-sectional shape. Air flowing sidewards and rearward along basic cross-sectional shape is guided along the turn signal lens surfaces into the air intakes.

8 Claims, 5 Drawing Sheets

MOTORCYCLE UPPER-COWL

BACKGROUND OF THE INVENTION (1) Field of the Invention

The present invention relates to a motorcycle upper-cowl which covers the handlebars, instruments and the like in the top portion of the front part of a motorcycle to reduce air resistance whilst making the front turn signals easily visible and also providing an efficiency-improved air intake for guiding air for engine supercharging, cooling heat exchanger, etc.

(2) Description of the Prior Art

A motorcycle upper-cowl is mounted to cover the handlebars, instruments, etc., in the portion of the front part of the motorcycle and is configured to smoothly lead air along its exterior surface from its front part to the rear outer sides during driving to reduce its air resistance. Typically, the upper cowl is integrally formed with an air intake that opens forward for guiding air for engine supercharging, heat exchanging and cooling, etc.

Arranged in the front part of a motorcycle are front turn signals. These turn signals are formed separately from, or integrally with, the upper-cowl. In either case, the turn signals are projected from their surroundings in order to secure their visibility.

A conventional upper-cowl for a motorcycle typically has an air-intake of which the opening is directed forward in order to secure improved intake efficiency. Therefore, this shape of the conventional upper-cowl made it difficult to minimize the air resistance thereof.

Illustratively, as shown in FIG. 1, the overall external surface of the upper-cowl is formed with a streamlined, basic cross-sectional shape (basic planar sectional shape) C such as an arc, parabola or some analogous section, which curves with its tangent being gradually directed toward the rear, from the forward part (the upper end in FIG. 1) to the rear outer sides (to the lower end in FIG. 1). This shape of the upper-cowl can produce an optimized, smooth airflow along its external surface, thus leading to a sharp reduction in air resistance. However, because most upper-cowls have headlamps 112 and 112 in the center thereof, a streamlined upper-cowl has openings of air intakes 113 and 113 in the outer, slanted portions on the sides of a headlamp cover 111. That is, the openings are not directed frontward, giving rise to the problem of the intake efficiency of air intakes 113 and 113 being lowered.

Further, in order to secure the visibility of the turn signals, it is necessary to arrange the turn signals so that they are projected from their surroundings in the upper-cowl whatever shape the upper-cowl has. Therefore, these projections degrade the air rectification of the upper-cowl, giving rise to the problem of increase in air resistance.

SUMMARY OF THE INVENTION

In view of the problems above, it is therefore an object of the present invention to provide a motorcycle upper-cowl which covers the handlebars, instruments and the like in the top portion of the front part of a motorcycle to reduce air resistance whilst making the front turn signals easily visible and also providing an efficiency-improved air intake for guiding air for engine supercharging, cooling heat exchanger, etc.

In order to achieve the above object, the present invention is configured as follows:

In accordance with the first aspect of the present invention, a motorcycle upper-cowl for covering the front side of the handlebars, instruments and the like in the top portion of the front part of a motorcycle, includes:

an upper-cowl body which has a streamlined, basic cross-sectional shape, such as arc, parabola or some analogous cross-section, curving with its tangent being gradually directed toward the rear, from the forward part to the rear outer sides;

air intake means for engine supercharging, cooling heat exchanger and the like, provided in the body and opening forward; and a pair of turn signal lenses covering turn signal lamps provided, on the outer sides of the opening of the air intake means, adjacent thereto or in proximity thereto, so as to be projected forward from the basic cross-sectional shape.

In accordance with the second aspect of the present invention, the motorcycle upper-cowl having the above first feature is characterized in that the inner side, adjoining to the air intake means, of the turn signal has a cross-section slanted inward and rearward.

In accordance with the third and fourth aspects of the present invention, the motorcycle upper-cowl having the above first or second feature is characterized in that the air intake means comprises a pair of air intakes arranged, respectively, on the left and right sides of the upper-cowl body.

In accordance with the fifth and sixth aspects of the present invention, the motorcycle upper-cowl having the above first or second feature is characterized in that the air intake means is arranged in the center of the upper-cowl panel.

According to the first feature of the invention, since the projected configuration of the turn signal lenses from the external shape with a basic cross-section assures their visibility while the external shape having a streamlined basic cross-section assures smooth flow of air, it is possible to cancel out the degradation of air rectification due to the projected turn signal lenses, thus making it possible to reduce the air resistance as a whole. Further, since the projections of the turn signal lenses on the outer sides of the openings of the air intakes, guide air flowing along the external surface having the basic section, sidewards and rearwards into the air intakes, it is possible to improve intake efficiency of the air intakes.

According to the second feature of the invention, since air hitting the outer sides of the air intakes can be guided into the air intakes by the turn signal lenses, it is possible to achieve a further improved intake efficiency of the air intakes.

According to the third to sixth features of the invention, the effects of the first and second features can be further enhanced.

DESCRIPTION OF THE PREFERRED EMBODIMENTS

Figure 1:
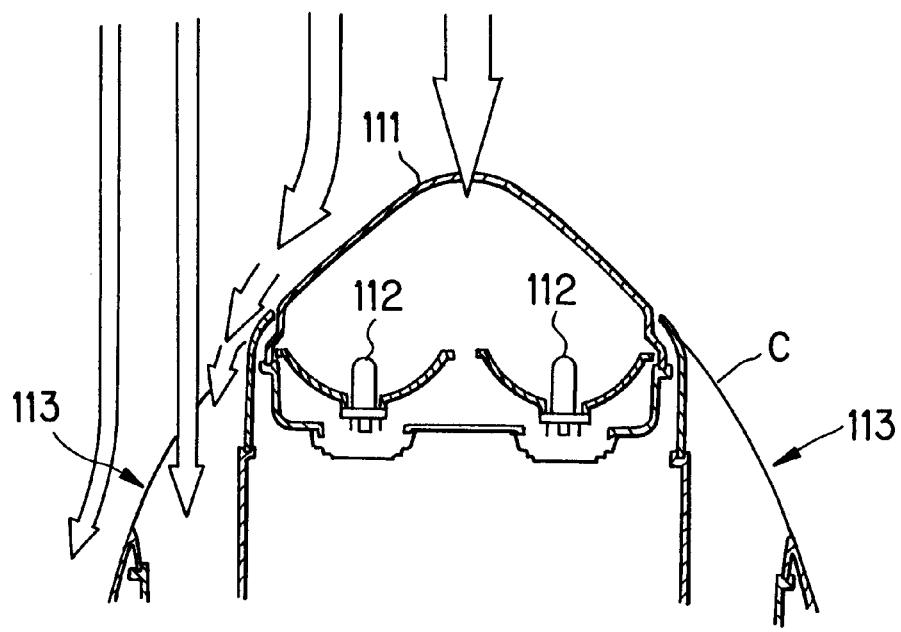
FIG. 1 is a cross-sectional view showing a comparative example of a motorcycle upper-cowl.
Figure 2:
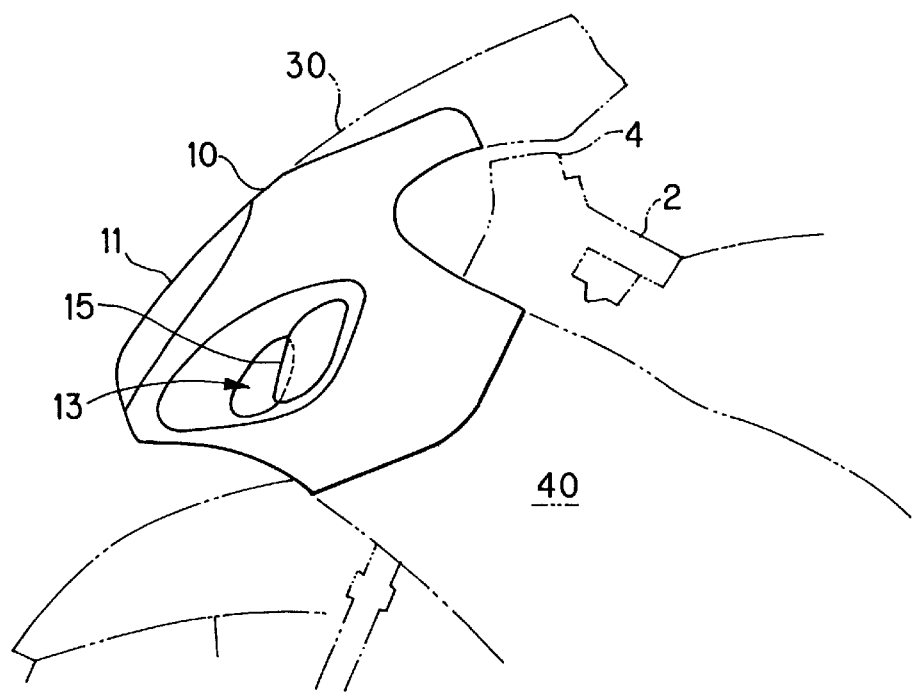
FIG. 2 is a side view showing a motorcycle upper-cowl in accordance with the first embodiment of the present invention.
Figure 3:
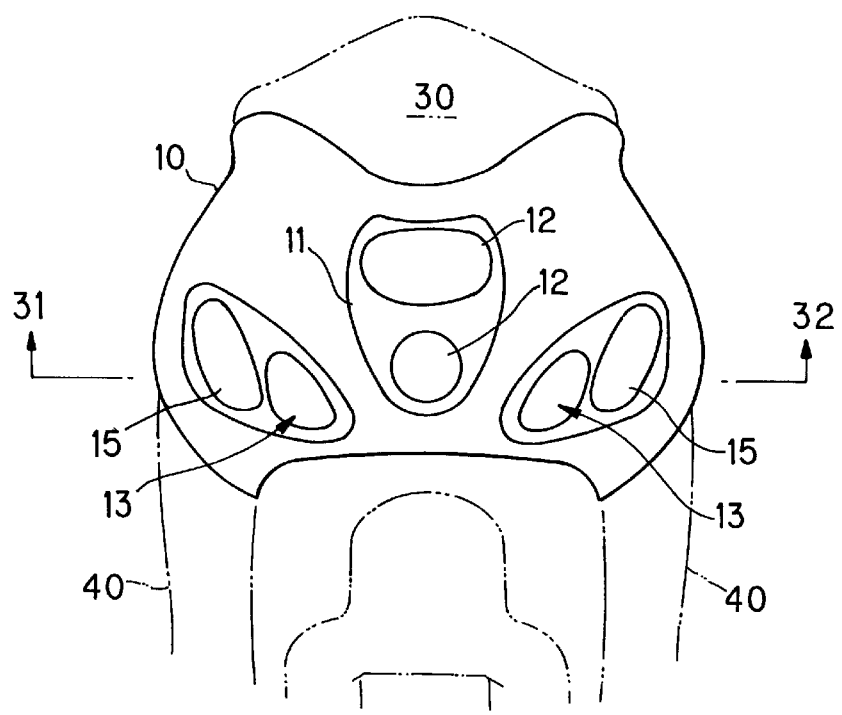
FIG. 3 is a front view showing the motorcycle upper-cowl of FIG. 2.
Figure 4:
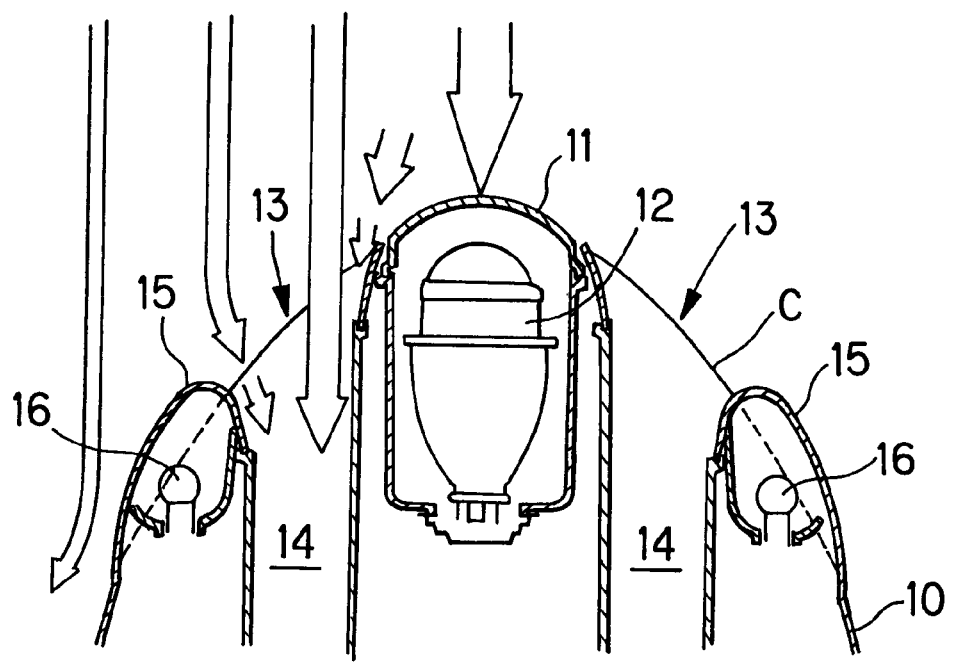
FIG. 4 is a cross-sectional view taken along a line 31–32 of FIG. 3.
Figure 5:
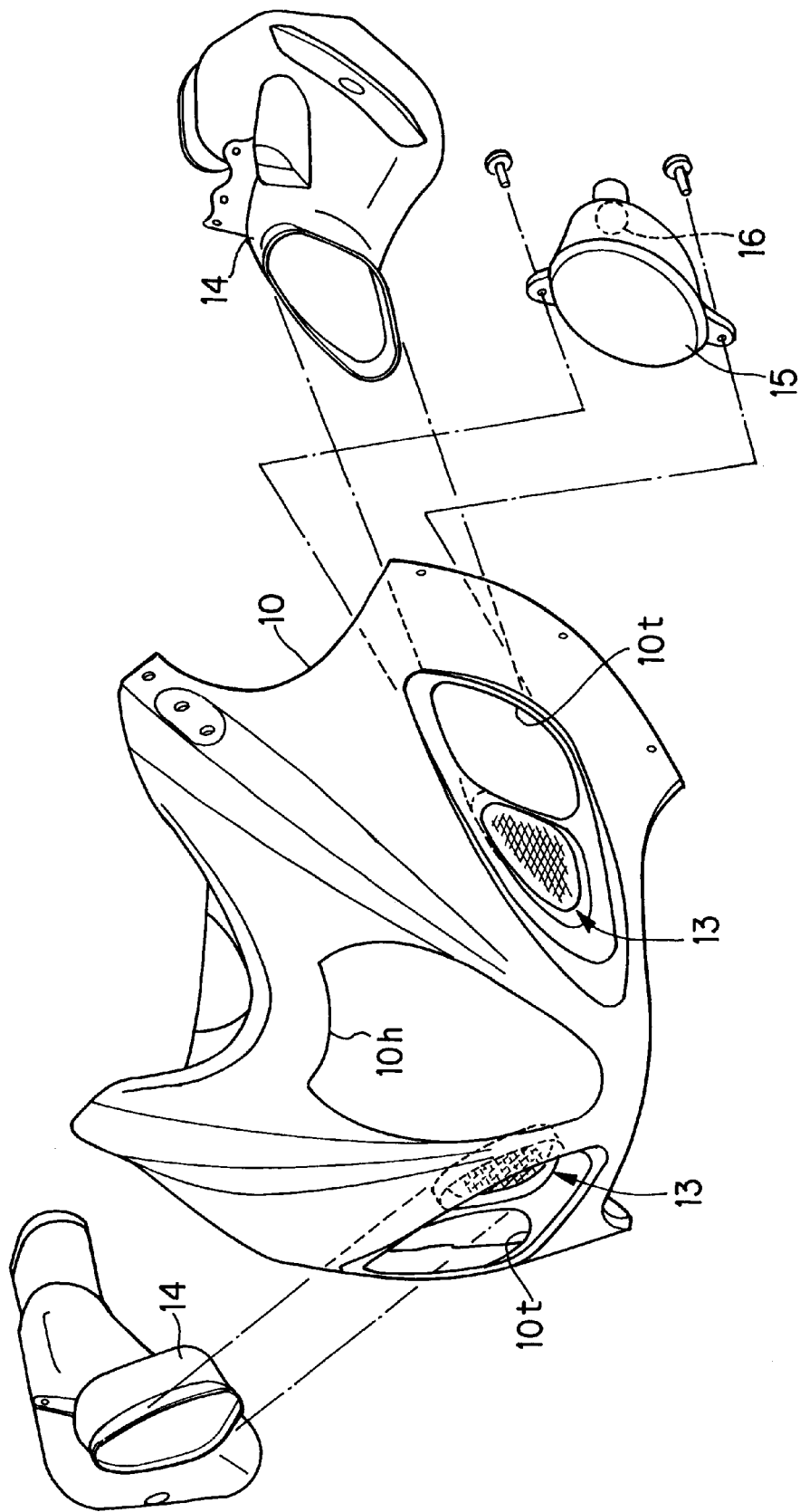
FIG. 5 is an exploded perspective view showing the motorcycle upper-cowl of FIG. 2.

The embodiments of the present invention will hereinafter be described with reference to the accompanying drawings. FIGS. 2 to 5 illustrate the first embodiment of the present invention. FIG. 2 is a side view showing a motorcycle upper-cowl; FIG. 3 is a front view of the same; FIG. 4 is a cross-sectional view (planar section) taken along a line 31–32 of FIG. 3; and FIG. 5 is an exploded perspective view showing the motorcycle upper-cowl of FIG. 2.

As shown in FIGS. 2 and 3, the motorcycle upper-cowl (upper-cowl body 10) according to the embodiment of the present invention, is mounted to cover the front side of handlebars 2 and instruments 4 etc. in the top portion of the front part of the motorcycle (on the left side in FIG. 2). That is, this upper-cowl is configured to smoothly lead air along its exterior surface, during driving, from its front part to the rear outer sides so as to reduce the motorcycle's air resistance in combination with a windscreen 30 and under-cowls 40 and 40.

As shown in FIGS. 4 and 5, the overall external surface of upper-cowl body 10 (except headlamp mounting portion 10h, air intakes 13 and 13, turn signal mounting portions 10t and 10t and the like), is formed with a streamlined, basic cross-sectional shape (basic planer cross-sectional shape) C such as an arc, parabola or some analogous section, which curves with its tangent being gradually directed toward the rear, from the forward part (the upper end in FIG. 4) to the rear outer sides (to the lower end in FIG. 4). Upper-cowl body 10 has a hollow, headlamp mounting portion 10h in the forward part thereof, and this headlamp mounting portion 10h has a headlamp cover 11 so as to cover the front side (the upper side in FIG. 4) of a headlamp 12. Headlamp cover 11 has an external surface having a cross-section which is aligned with the streamlined, basic cross-sectional shape C of upper-cowl body 10.

The outer sides of headlamp cover 11 (headlamp mounting portion 10h) located at the forward part of upper-cowl body 10 are inclined sidewards and rearwards, The openings of air intakes 13, 13 for guiding air for engine supercharging (or for cooling heat exchanger) are arranged in these inclined portions. Accordingly, the openings of air intakes 13, 13 are not directed frontward (upward in FIG. 4) but directed in an obliquely forward direction (upper right and left directions in FIG. 4). Provided on the rear of air intakes 13, 13 are intake ducts 14, 14 extending rearwards (to the bottom in FIG. 4) so as to supply intake air to an unillustrated air-cleaner of the engine.

Hollowed, turn signal mounting portions 10t, 10t are formed adjoining to or in proximity to the outer sides of air intakes 13, 13 of upper-cowl body 10. A pair of turn signal lenses 15, 15 are attached at turn signal mounting portions 10t, 10t so as to cover the front of turn signal lamps 16, 16 and be projected sidewards and forwards (to the upper right and left in FIG. 4) from the upper-cowl 10 surface having the streamlined, basic cross-sectional shape C. The external surface of turn signal lens 15 is formed so as to have a convex, streamlined cross section such as an arc, parabola or some analogous section, from the forward part (the top in FIG. 4) to the outer rear part (the bottom in FIG. 4) while the surface of the turn signal lens on the inner side towards air intake 13 is inclined inwards and rearwards.

In the upper-cowl thus configured, since turn signal lenses 15, 15 are configured to project from their surroundings, i.e., the basic cross-sectional shape C of upper-cowl body 10, it is possible to secure visibility of turn signal lenses 15, 15. Further, since the upper-cowl is configured to have the streamlined, basic cross-sectional shape C such as an arc, parabola or some analogous section, which curves with its tangent being gradually directed toward the rear, from the forward part to the rear outer sides, air flow along the external surface of the upper-cowl can be made smooth. Therefore, it is possible to cancel out the degradation of air rectification due to projections of turn signal lenses 15, 15, thus making It possible to reduce the air resistance as a whole.

Since the projections of turn signal lenses 15, 15 on the outer sides of the openings of air intakes 13, 13, guide air flowing along the external surface, having the basic cross-sectional shape C, sidewards and rearwards into air intakes 13, 13, it is possible to improve intake efficiency of air intakes 13, 13 which do not open to the front. Further, since the surfaces of turn signal lenses 15, 15 on the inner side towards air intakes 13, 13 are inclined inwards and rearwards in the cross-section, air hitting the outer sides of air intakes 13, 13 can be guided to air intakes 13, 13 by turn signal lenses 15, 15, it is possible to further improve the intake efficiency of air intakes 13, 13.

Figure 6:
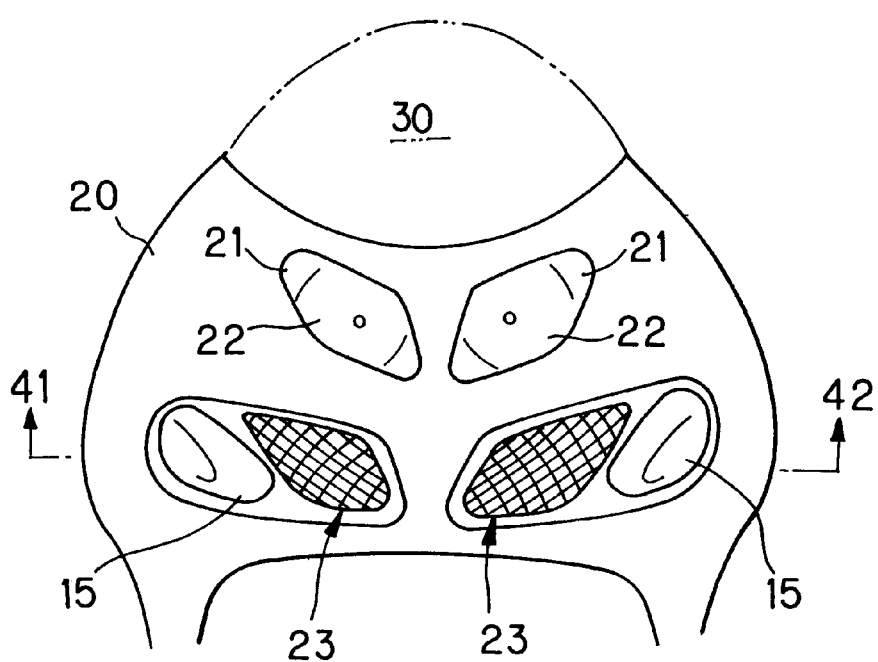
FIG. 6 is a front view showing a motorcycle upper-cowl in accordance with the second embodiment of the present invention.
Figure 7:
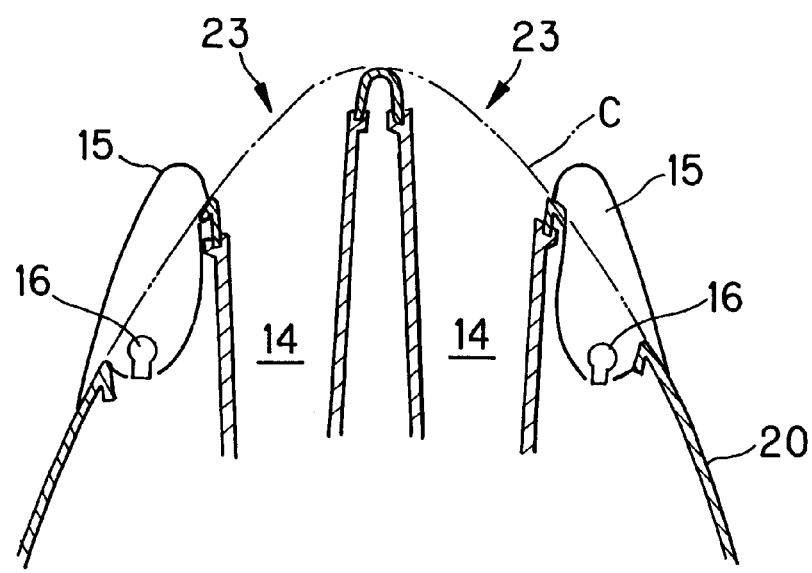
FIG. 7 is a cross-sectional view taken along a line 41–42 of FIG. 6.

FIGS. 6 and 7 illustrate the second embodiment of the present invention. FIG. 6 is a front view showing a motorcycle upper-cowl; and FIG. 7 is a cross-sectional view taken along a line 41–42 of FIG. 6. Here, the same components as in the first embodiment will be allotted with the same reference numerals so that the description can be omitted.

As shown in FIGS. 6 and 7, the overall external surface of an upper-cowl body 20 is formed with a streamlined, basic cross-sectional shape (basic planer cross-sectional shape) C. A pair of headlamp covers 21, 21 are mounted in the portion of the front part of upper-cowl body 20 so as to cover the front side of headlamps 22, 22. The external surfaces of headlamp covers 21, 21 are formed with an external surface having a cross-section which is aligned with the streamlined, basic cross-sectional shape C of upper-cowl body 20.

Provided in the front lower portion of upper-cowl body 20, that is, below headlamp covers 21, 21, are the openings of air intakes 23, 23 for guiding air for engine supercharging. Accordingly, the openings of air intakes 23, 23 are arranged so as to be directed substantially frontward. Intake ducts 14, 14 are provided in the rear of air intakes 23, 23, extending rearwards so as to supply intake air to an unillustrated air-cleaner of the engine. A pair of turn signal lenses 15, 15 are attached on the outer sides of air intakes 23, 23 of upper-cowl body 20 so as to be projected forwards from the upper-cowl body 20 surface having a streamlined, basic cross-sectional shape C.

In the upper-cowl thus configured, since the openings of air intakes 23, 23 are directed substantially frontward, the basic design of air intakes 23, 23 provides for a high intake efficiency. However, the arrangement of turn signal lenses 15, 15 on the outer sides of air intakes 23, 23 in a forward projected manner further enhances the intake efficiency of air intakes 23, 23.

To here, the embodiments of the invention have been described, but the invention should not be limited to the above. For example, in the above embodiments, two air intakes are provided on left and right sides of the upper-cowl, however air intakes may be provided on upper and lower sides of the upper-cowl, or a relatively large air intake may be formed in the center of an upper-cowl.

Thus, in accordance with the first feature of the invention, since the projected configuration of the turn signal lenses from the external shape with a basic cross-section assures their visibility while the external shape having a streamlined basic cross-section assures smooth flow of air, it is possible to cancel out the degradation of air rectification due to the projected turn signal lenses, thus making it possible to reduce the air resistance as a whole. Further, since the projections of the turn signal lenses on the outer sides of the openings of the air intakes, guide air flowing along the external surface having the basic section, sidewards and rearwards into the air intakes, it is possible to improve intake efficiency of the air intakes.

In accordance with the second feature of the invention, since air hitting the outer sides of the air intakes can be guided into the air intakes by the turn signal lenses, it is possible to achieve a further improved intake efficiency of the air intakes.

In accordance with the third to sixth features of the invention, the effects of the first and second features can be further enhanced.

What is claimed is:

1. A motorcycle upper-cowl for covering the front side of handlebars and instruments in a top portion of a front part of a motorcycle, the upper-cowl comprising:

an upper-cowl body which includes a forwardmost portion, the upper-cowl body having a streamlined contoured exterior surface with lateral side portions formed by a curved tangent surface extending from the forwardmost portion to outwardly projecting rearward ends;

air intake means for at least one of engine supercharging and cooling a heat exchanger, the air intake means including a pair of openings being provided in the body and opening forwardly with the forwardmost portion being positioned between the pair of openings; and a pair of turn signal lenses covering turn signal lamps provided proximate to outer sides of the pair of openings of the air intake means with the pair of openings being provided between the forwardmost portion and the signal lenses, each signal lens having a tip portion projecting forwardly from a respective lateral side portion of the upper-cowl adjacent an outer side edge of a respective opening of the air intake means and beyond the curved tangent surface of the respective lateral side portion for directing air into the respective opening.

2. The motorcycle upper-cowl according to claim 1, wherein the inner side, adjoining to the air intake means, of the turn signal has a cross-section slanted inward and rearward.

3. The motorcycle upper-cowl according to claim 1, wherein the pair of air intake openings are arranged, respectively, on the left and right sides of the upper-cowl body.

4. The motorcycle upper-cowl according to claim 2, wherein the pair of air intake openings are arranged, respectively, on the left and right sides of the upper-cowl body.

5. The motorcycle upper-cowl according to claim 1, wherein the upper-cowl body has a cross-section in the shape of an arc.

6. The motorcycle upper-cowl according to claim 1, wherein the upper-cowl body has a cross-section in the shape of a parabola.

7. The motorcycle upper-cowl according to claim 1, wherein the pair of turn signal lenses are adjacent to the outer side edges of the opening of the air intake means.

8. The motorcycle upper-cowl according to claim 1, wherein the lenses are contoured to direct air into the air intake means.

* * * * *